United States Patent [19]

Itoh et al.

[11] Patent Number: 4,763,270

[45] Date of Patent: Aug. 9, 1988

[54] NAVIGATION SYSTEM FOR A VEHICLE AND METHOD THEREFOR

[75] Inventors: Toshiyuki Itoh; Hiroshi Ueno, both of Yokosuka; Masakazu Tsunoda, Fujisawa; Seiichi Tohjyo, Zama, all of Japan

[73] Assignee: Nissan Motor Company, Limited, Kanagawa, Japan

[21] Appl. No.: 842,363

[22] Filed: Mar. 19, 1986

[30] Foreign Application Priority Data

Mar. 20, 1985 [JP] Japan ................. 60-57477

[51] Int. Cl.⁴ .......................................... G06F 15/50
[52] U.S. Cl. .................... 364/449; 340/988; 340/990; 340/995
[58] Field of Search ............... 364/443, 444, 449, 460, 364/521; 73/178 R; 342/450, 451; 340/988, 990, 995

[56] References Cited

U.S. PATENT DOCUMENTS

| | | | |
|---|---|---|---|
| 4,490,717 | 12/1984 | Saito | 340/995 |
| 4,511,973 | 4/1985 | Miura et al. | 340/990 |
| 4,535,335 | 8/1985 | Tagami et al. | 340/988 |
| 4,660,037 | 4/1987 | Nakamura | 340/990 |
| 4,663,629 | 5/1987 | Tagami et al. | 340/988 |

FOREIGN PATENT DOCUMENTS 0073618 3/1983 European Pat. Off.
0126456 11/1984 European Pat. Off.

*Primary Examiner*—Gary Chin
*Attorney, Agent, or Firm*—Lowe, Price, LeBlanc, Becker & Shur

[57] ABSTRACT

A navigation system and method for guiding a vehicle along a selected route of travel to a destination from a start point using a display unit. In the navigation system, a registered intersection nearest to the present position of the vehicle, present on the set route of travel and registered in a roadmap data, is used as the first intersection on the route of travel through which the vehicle is to pass. The vehicle can be guided toward the first intersection and if the driver manually triggers the system upon reaching the first intersection, the guidance process for the selected route can begin. Otherwise, the system again checks to see which of the registered intersections is closest to the vehicle, and the above process is repeated.

14 Claims, 9 Drawing Sheets

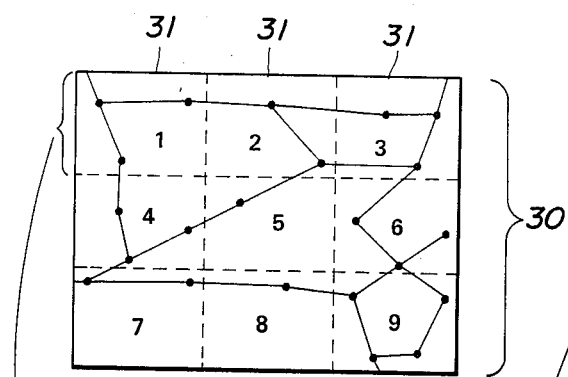
FIG.2
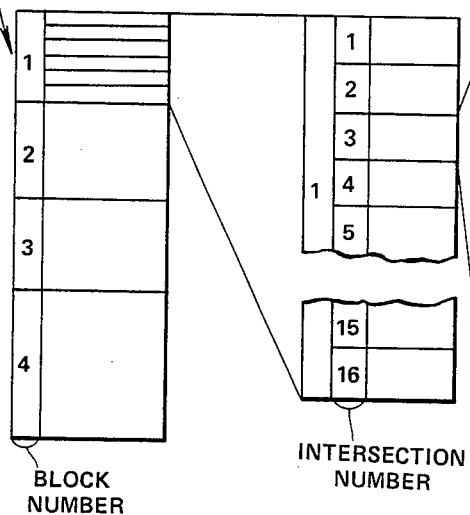
FIG.3
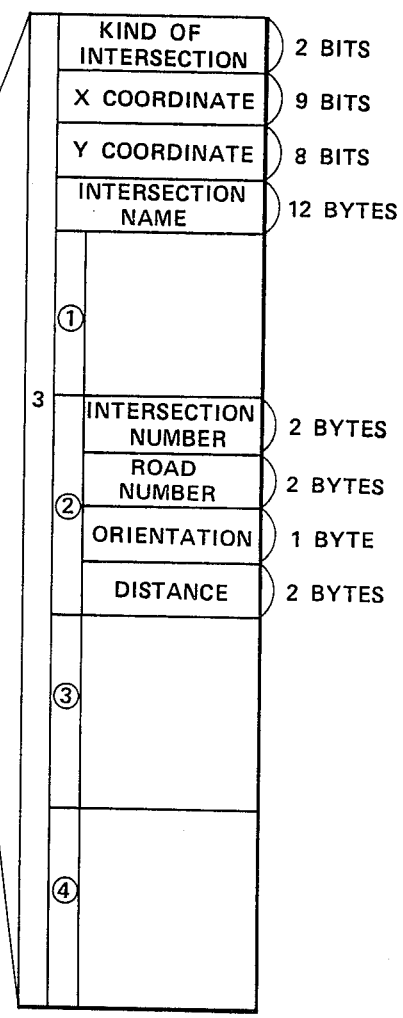

NAVIGATION SYSTEM FOR A VEHICLE AND METHOD THEREFOR

BACKGROUND OF THE INVENTION

The present invention relates generally to a navigation system for a vehicle and method therefor. More particularly, the present invention relates to navigation systems and methods employing a graphic display unit on which a roadmap and the current position of the vehicle are displayed, so that the driver of the vehicle can drive the vehicle in accordance with a preset travel course displayed on the display unit.

This kind of navigation system for vehicles is disclosed in a Japanese Patent Application Unexamined Open No. Sho. 58-150814, published on Sept. 7, 1983. In this Japanese Patent Application document, data, specifically main passage points such as intersection, specifying a route of travel from a start point to a destination are entered and stored with reference to the displayed roadmap. Whenever the vehicle approaches one of these main passage points, the navigation system detects the approach of the main passage point and displays information such as messages to "turn left" or "go straight", indicating passage of the main passage point, and arrival at the destination, so that the driver can more easily reach the destination with the guidance of the navigation system.

However, the conventional navigation system has the problem described below. Guidance along the course of travel is generally initiated in response to a command to start the guidance process at a registered intersection designated as the starting point of the set route of travel Thus, if the vehicle should fail to pass through the registered intersection at which the route should have started or if the driver should fail to give the command to start the guidance process when the vehicle returns the first intersection, the driver must take the trouble of returning to that intersection or point in order to properly start the guidance process. Consequently, there is occasionally some inconvenience in starting on the selected course of travel.

SUMMARY OF THE INVENTION

With the above-described problem in mind, it is an object of the present invention to provide a navigation system for a vehicle and a method therefor which can guide the vehicle to the destination from an intersection near the rest position of the vehicle and through which the vehicle can be guided to the destination without having to direct the vehicle to a specific intersection or without having to reset the course of travel.

The above-described object can be achieved by providing: a system for navigating a vehicle, comprising: (a) first means for monitoring a distance travelled by the vehicle and vehicle direction and deriving the instantaneous position of the vehicle, (b) second means for storing roadmap data including data on a plurality of known branching points, (c) third means allowing designation of a route of travel from a first known branching point through which the vehicle is first to pass to a final destination, (d) fourth means for searching through the known branching points present on the designated route of travel for the known branching point which is nearest to the present position of the vehicle derived by the first means, (e) fifth means responsive to a command to start a navigation process for the vehicle along the designated route of travel by which the vehicle is guided from the known branching point found by the fourth means to the destination, and (f) sixth means which operatively issues the command to start the navigation process to the fifth means.

BRIEF DESCRIPTION OF THE DRAWINGS

A more complete understanding of the present invention may be obtained from the following detailed description taken in conjunction with the attached drawings in which:

FIGS. 2 and 3 show the roadmap data format used in a map data storage unit shown in FIG. 1;

DETAILED DESCRIPTION OF THE PREFERRED EMBODIMENTS

Reference will be made to the drawings in order to facilitate understanding of the present invention.

Figure 1:
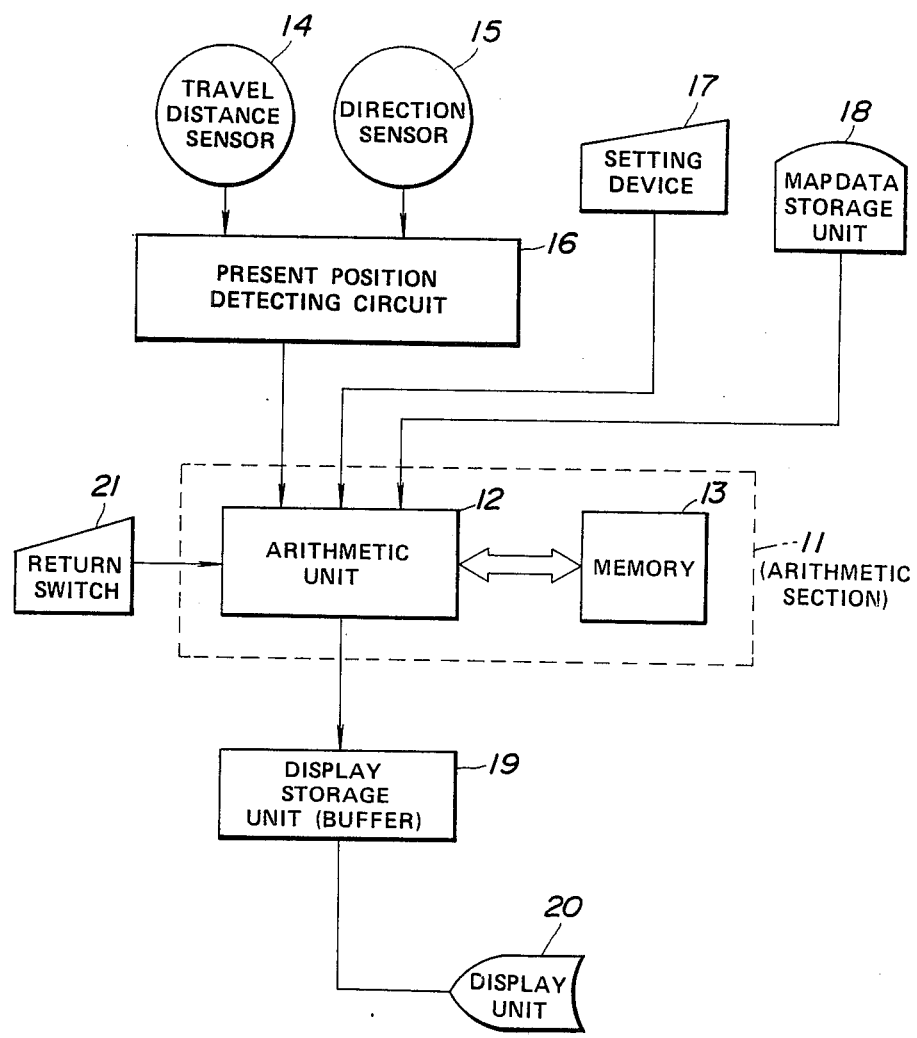
FIG. 1 is a circuit block diagram of a preferred embodiment of a navigation system for a vehicle according to the present invention.

FIG. 1 is a circuit block diagram of the navigation system for the vehicle representing a first preferred embodiment according to the present invention.

As shown in FIG. 1, the navigation system comprises an arithmetic section 11, in practice, a microprocessor. The arithmetic section 11 includes an arithmetic unit 12 and memory 13. The input side of the arithmetic section 11 is connected to a current position detecting circuit 16 which monitors the current position of the vehicle on the basis of the output signals of a travel distance sensor 14 and a direction sensor 15, a setting device 17 for receiving and providing an information on the current position of the vehicle and the destination of the vehicle, a roadmap data storage unit 18, and a return switch 21. The direction sensor 15 detects the angle between geomagnetic North and the orientation of the vehicle.

An output section, e.g., the output interface of the arithmetic section 11 is connected to a display unti 20 (which may be a CRT (Cathode Ray Tube) or the like) capable of displaying an image of the roadmap etc. via a display storage unit 19 which temporarily holds display information signals.

FIGS. 2 and 3 illustrate an example of the structure of the roadmap data stored in the roadmap data storage unit 18 shown in FIG. 1. For example, each regional roadmap such as Japan national, Hokkaido, Tohoku, Kanto, Central, Kansai, Chugoku, Shikoku, Kyushu, and so on is further divided into a plurality of individual regions. The roadmap information for each region is stepwise divided from upper divisions such as national roads (interstate freeways in the United States) to lower divisions such as regional roads (Prefectural roads and City roads).

The storage area within the storage unit 18 is divided into a plurality of blocks corresponding to regional areas 31 into which the map (FIG. 2) is subdivided. In addition, each block is subdivided into a plurality of intersection areas, each including information on configuration of the intersection, such as a T-type or cross-type, X-Y coordinate information for identifying the location of the intersection, the intersection name, and the intersection number, connecting road number, direction, and distance to all neighboring major intersections.

FIGS. 4(A) through 4(D) integrally form a flowchart for explaining an action of the navigation system.

The flowchart shown in FIGS. 4(A) through 4(D) is roughly divided into two processing blocks; (a) initial selection of the course of travel and initial guidance to an intersection from which the vehicle is to start (steps 101 through 107); and (b) road guidance along the selected route.

To select the route of travel, the setting device 17 is used to identify the starting point of the vehicle, i.e. its current location, and its destination (step 101). Next, the intersection nearest the starting point is selected from among the intersections adjacent to the starting point and a target intersection through which the vehicle is to pass last is selected from among the intersections adjacent to the destination (step 102). Next, the shortest course interconnecting these intersections is automatically found and the route initialization process is ended (step 103).

Thereafter, a direction display for guiding the vehicle to the start intersection according to the essential part of the present invention is operated (a step 104).

Figure 4:
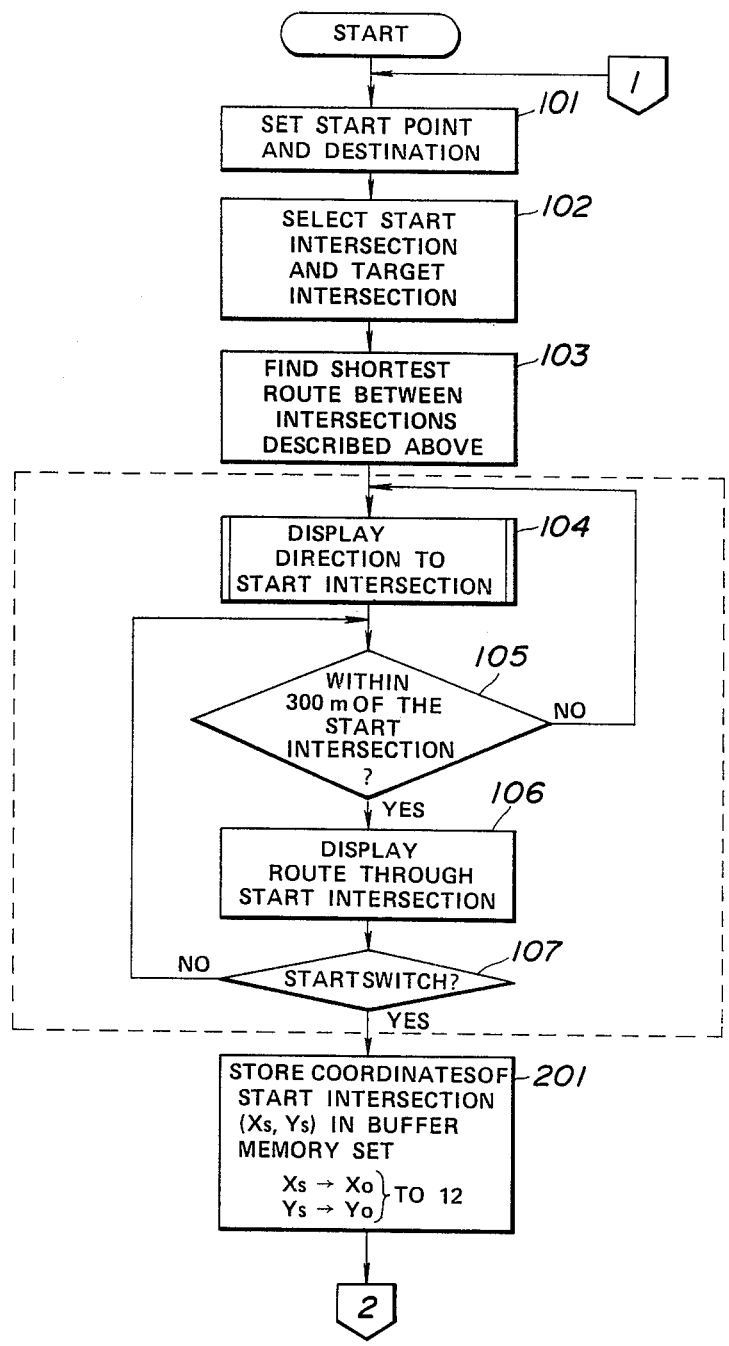
FIGS. 4(A) through 4(E) are integrally a processing flowchart for executing a vehicle guidance process in the navigation system shown in FIG. 1.
Figure 4:
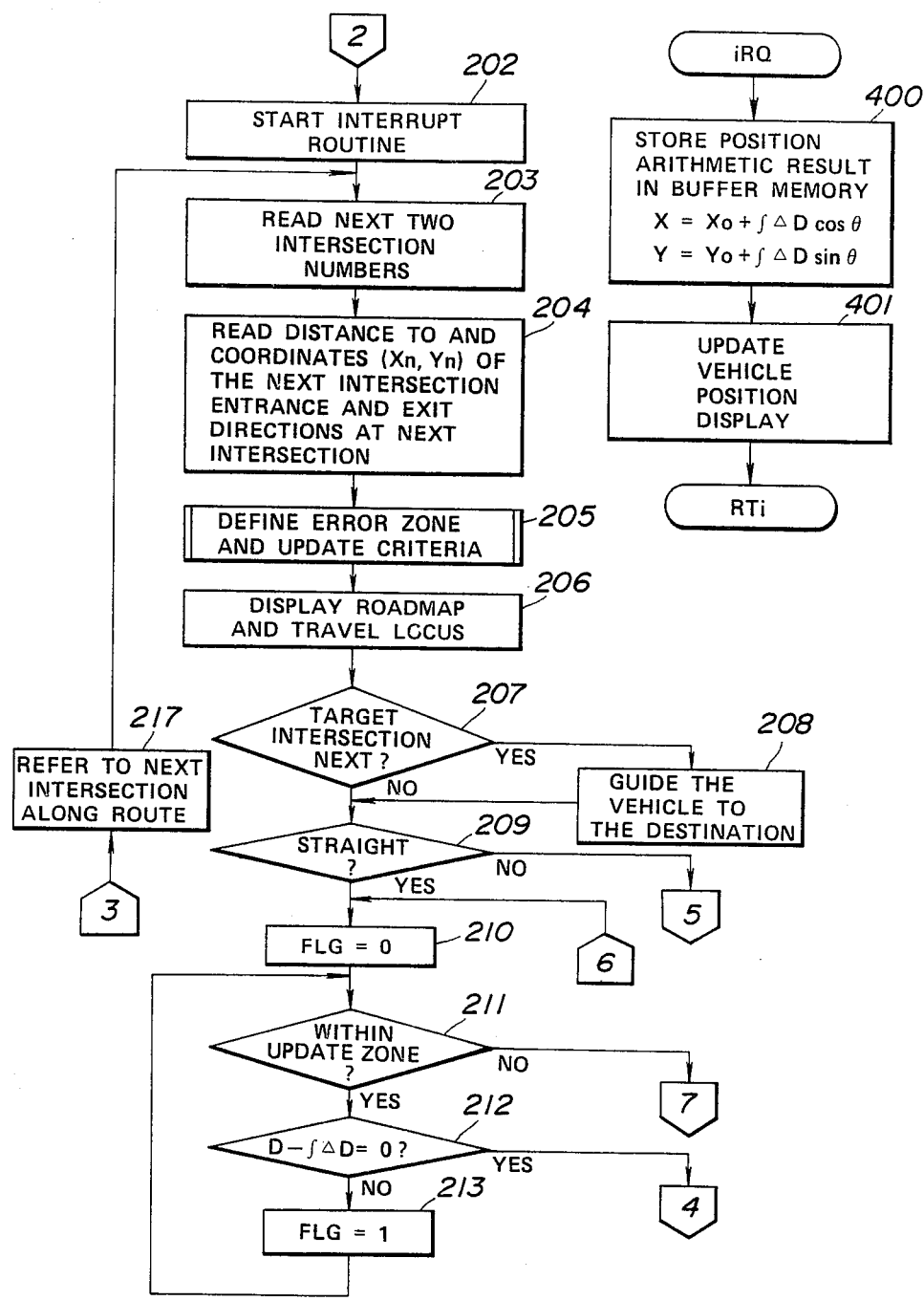
Figure 4:
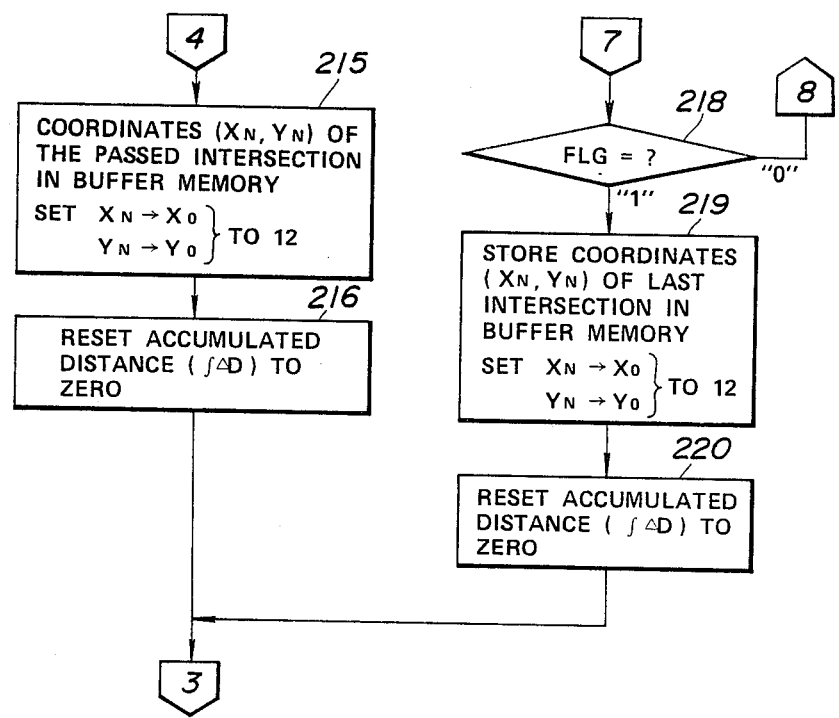
Figure 4:
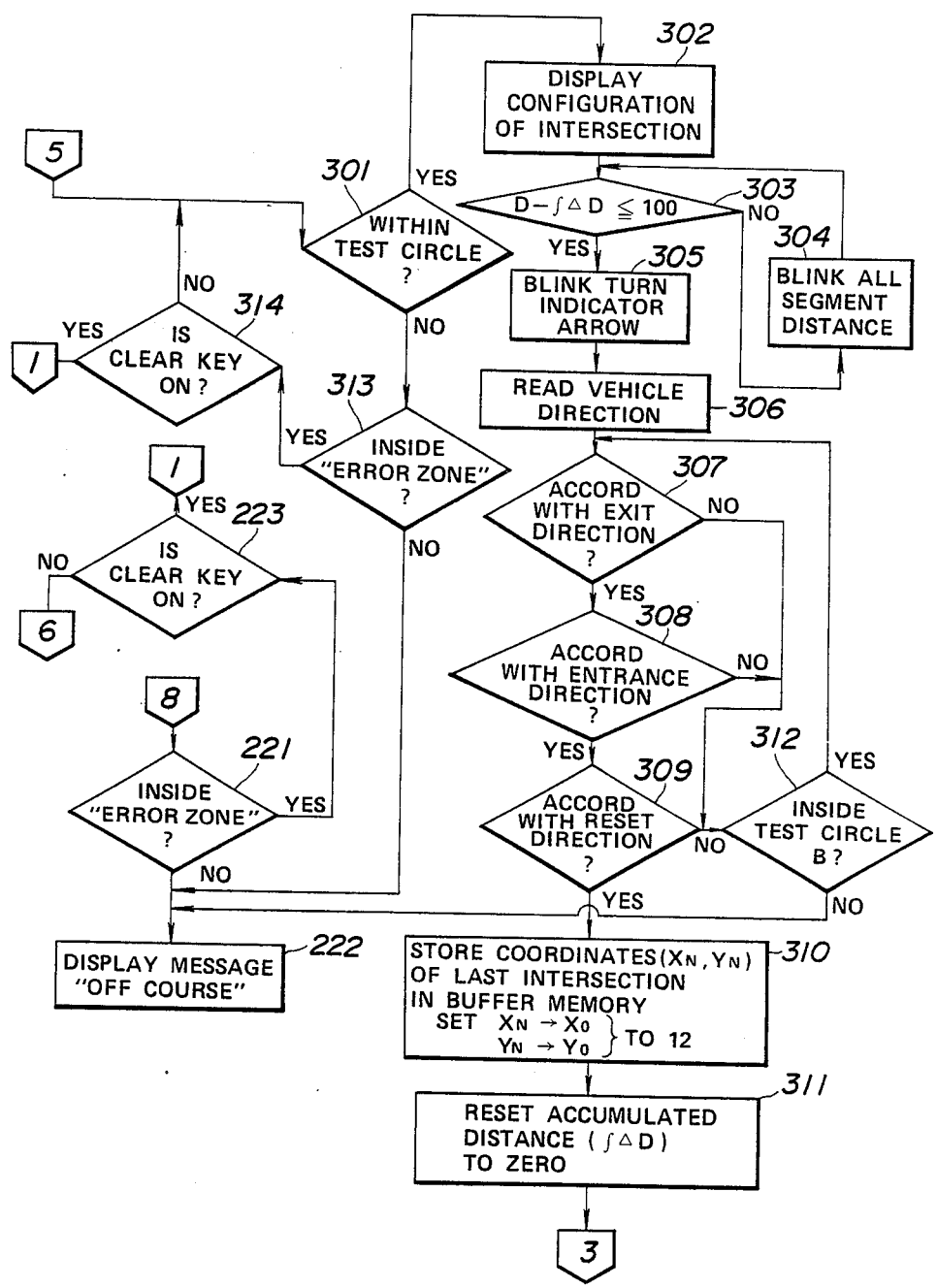
Figure 4:
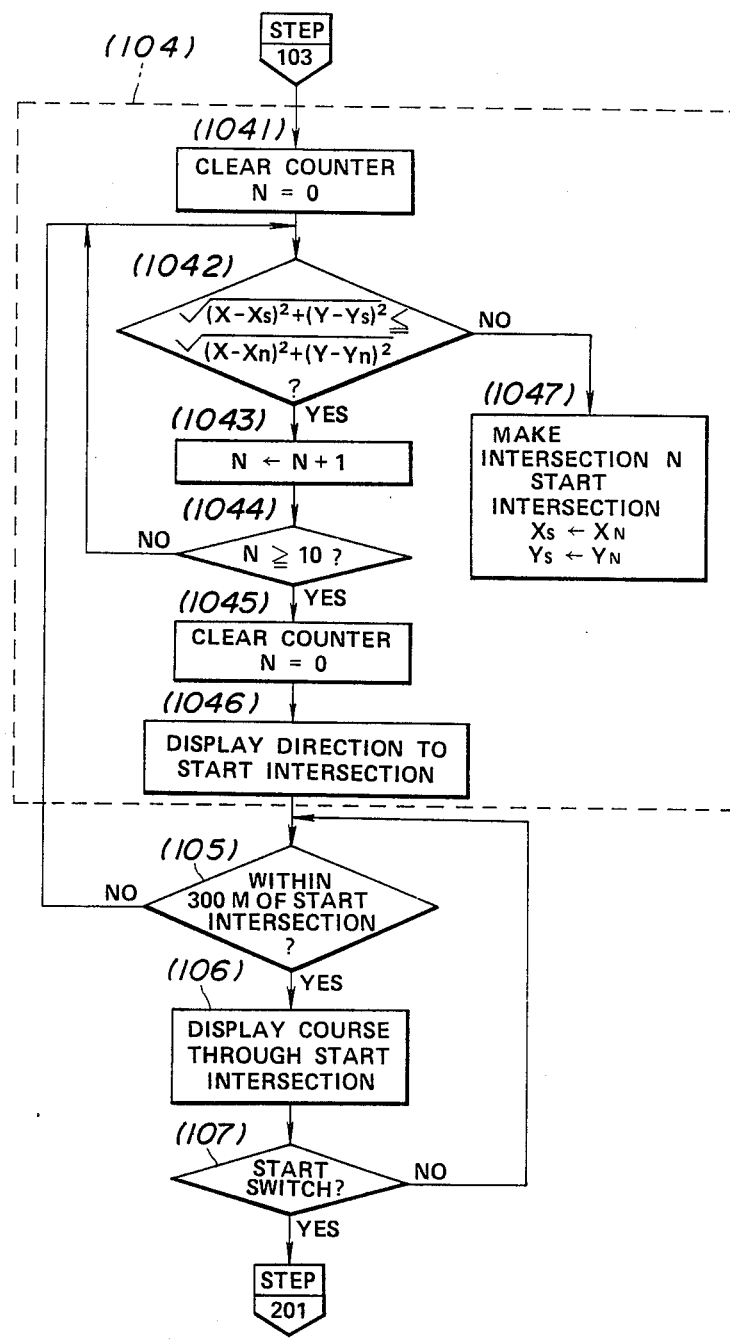
Figure 5:
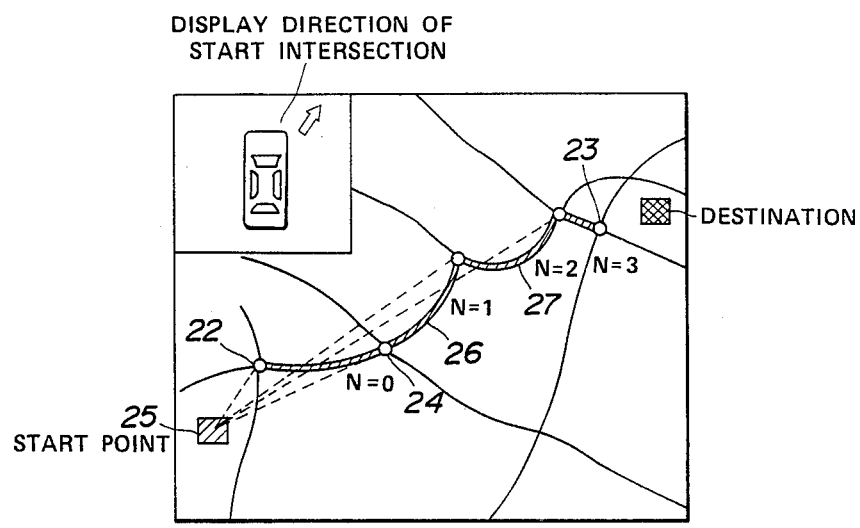
FIG. 5 is an exemplary graphic image displayed on a display unit for explaining the theory of the processing shown in FIGS. 4(A) through 4(E)
Figure 6:
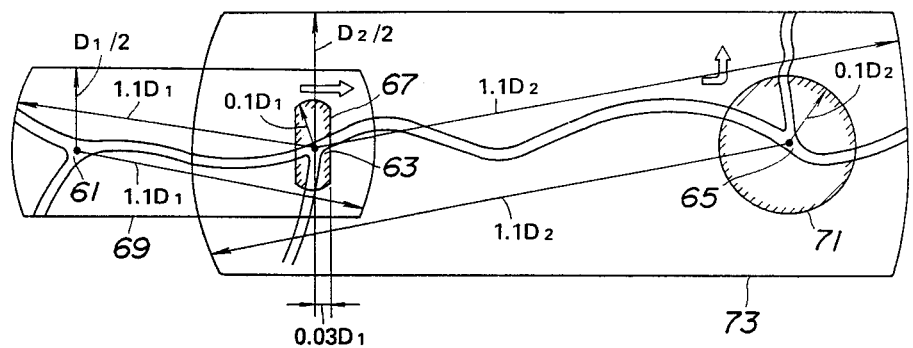
FIGS. 6 and 7 are diagrams for explaining the theory of guidance of the vehicle along a set route of travel shown in FIGS. 4(A) through 4(E).
Figure 7:
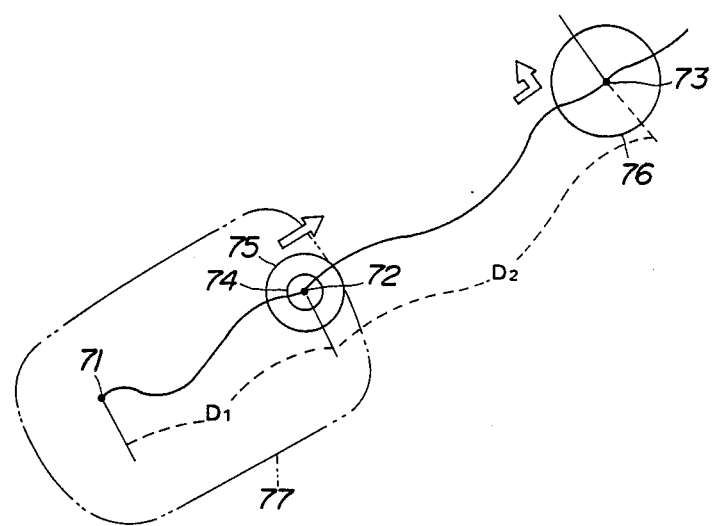

The start intersection direction display will be described with reference to a subroutine flowchart in FIG. 4(E) and the diagrammatic displays in FIGS. 5 and 6.

Suppose that the coordinates of the start point (in this embodiment, the center of a rectangular region including the actual start point is assumed to be a provisional start point) are $(X_s, Y_s)$, those of the present vehicle position are $(X, Y)$, and the coordinates of the Nth intersection along the set route 26 are $(X_N, Y_N)$.

When the routine starts, in a step 1041 the intersection 24 subsequent to the start intersection 22 (refer to FIG. 5) is assigned the value N=0 (zero), which means it is the first intersection to be subjected to a distance comparison with respect to the start intersection 22.

In a step 1042, the distance between the present position $(X, Y)$ and the start intersection $(X_s, Y_s)$ is compared with that between the present position $(X, Y)$ and the intersection in question, i.e. that corresponding to the current value of N. If the distance between the present position and the start intersection is equal to or shorter than the other mentioned distance, i.e., if $$\sqrt{(x - x_s)^2 + (y - y_s)^2} \leq \sqrt{(x - x_N)^2 + (y - y_N)^2},$$

the value of counter N is incremented by +1 (plus one) in the next step 1043. Thus, for each of the second, third, fourth etc. intersections counting from the start intersection, the distance comparison with regard to the start intersection 25 is carried out.

If none of the first to tenth intersections are nearer the vehicle position than the start intersection, the counter is cleared in a step 1045 following a check for the tenth intersection at step 1044. If the start intersection 25 selected in the initial stage is recognized directly as the start intersection, the direction from the vehicle to the set start intersection is displayed (superimposed) in the upper-lefthand corner of the displayed image as shown in FIG. 6, using a vehicle symbol or icon and an arrow indicator. This shows the driver the direction in which the vehicle is to travel to reach the start intersection.

On the other hand, if any one of the ten intersections checked is nearer than the initially selected start intersection when checked in the step 1042, the coordinates $(X_N, Y_N)$ of that intersection will replace the coordinates $(X_s, Y_s)$ so that the above-described nearer intersection is newly set as the start intersection (step 1047). Then, the direction to the newly set start intersection is similarly superimposed on the display 1046.

Thereafter, until the vehicle approaches to within 300 meters of the set start intersection, the above-described display process (step 104) is repeated. The intersection which is currently closest to the vehicle from among the first (N=0) to tenth (N=10) intersections is used as the start intersection and the direction theretoward is continuously displayed.

When the vehicle approaches to within 300 meters of the start intersection, the positional relationship between the present direction of approach to the start intersection and the direction assumed after the vehicle passes through the start intersection is displayed graphically with the upper edge of the image being oriented in the direction in which the vehicle is travelling (in a step 106).

Under these conditions, if the start switch is depressed in a step 107, the guidance operation for the route of travel is started from the start intersection selected in the above processing.

Hence, the vehicle can always reach a start intersection. Even though the vehicle may not reach the start intersection initially selected because the driver loses his way, guidance along the selected route of travel can be initiated from any intersection the vehicle can reach provided that intersection is a registered intersection stored in the roadmap data storage unit 18 and the start switch is depressed at that place. Consequently, the driver is not forced to tediously return to the initially selected start intersection or to reset the entire route.

In subsequent step 201, the coordinates $(X_s, Y_s)$ of the start intersection are used as the coordinates $(X_0, Y_0)$ of first intersection for use in later calculations by the arithmetic unit 12.

In step 202, a travel distance update interrupt routine (see step 400 in FIG. 4B) is enabled. The interrupt routine of FIG. 4(B) is triggered independently of the navigation program and thus the timing thereof does not necessarily coincide with the step 202.

In the interrupt routine, accumulated distance traveled from the initial point $(x_0, y_0)$ is calculated. Since the interrupt routine is triggered after every given interval $\Delta D$ of travel of the vehicle, the distance covered by the vehicle from the starting point or the most recent intersection will be the sum of all $\Delta D$'s, which will be hereafter referred to as "total travel distance $\int \Delta D$", at a step 400 in the interrupt routine. Also, in the step 400, the instantaneous vehicle position coordinates $(x, y)$ in the display map coordinate system are derived according to the following equations:

$$x = x_0 + \int (\Delta D \times \cos \theta)$$

$$y = y_0 + \int (\Delta D \times \sin \theta)$$

The derived total travel distance $\int \Delta D$ and the instantaneous vehicle position $(x, y)$ are transferred to the buffer memory in the display unit 20 for use in update vehicle position symbol on the map display, which is actually performed in the subsequent, final step 401.

At a step 203, data for the next two intersections are read out from the data memory 13. These include distance data indicative of the distance D from the first intersection to the next intersection and the known coordinates $(x_n, y_n)$ of the next intersection in the display map coordinate system. At the step 204, direction data are obtained indicative of the orientation of the vehicle as it approaches the next intersection from the most recent intersection, which direction will be hereafter referred to as "entry direction $\theta_{in}$" and the direction of vehicle as it travels away from the next intersection, which direction will be hereafter referred to as "exit direction $\theta_{out}$".

At a step 205, criteria for recognizing an intersection are derived. These include an update direction value $\theta_r$ derived from the entry direction $\theta_{in}$ and the exit direction $\theta_{out}$. The update direction $\theta_r$ is basically the bisector of the angle subtended by the entry direction $\theta_{in}$ and the exit direction $\theta_{out}$. It is derived in the following manner:

when the absolute value of the difference $\Delta\theta$ between the entry direction $\theta_{in}$ and the exit direction $\theta_{out}$ is smaller than 180°, the update direction $\theta_r = (\theta_{in} + \theta_{out})/2$; and when the difference $\Delta\theta$ is greater than 180°, the update direction $\theta_r = (\theta_{in} + \theta_{out})/2 + 180$.

At the step 205, an update zone which extends a given distance from the next intersection $(x_1, y_1)$ is also derived. The configuration of the update zone varies depending upon a distance D between the first update zone or the starting point and the next update zone. The configuration of the update zone is defined by the intersection of a circle and an elongated rectangle centered on the next intersection $(x_1, y_1)$, as seen in FIG. 6 at 67. The radius of the circle about the next intersection is 0.1D. The minor axis of the rectangle is 0.06D centered on the intersection and its major axis is longer than the radius of the circle. This figure is actually the geometric result of two criteria for recognizing that the vehicle position approximately coincides with the intersection, namely: (1) that the current detected vehicle position is within 0.1D of the intersection; and, (2) that the total travel distance $\int \Delta D$ is within $\pm 0.03D$ of the known distance between the two intersections in question. Note that the relatively high accuracy of the travel distance sensor is reflected in the 0.03D value and the relatively low directional accuracy is reflected in the 0.1D value.

An error zone is also set up in step 205. The error zone, which is illustrated at 69 and 73 in FIG. 6, is in the form of a rectangle extending from the first intersection 61 or the starting point to the next intersection 63. In addition, the longitudinal ends of the rectangle are defined by circles of radius 1.1D centered on the two intersections. The rectangle is 0.5D wide, so that the error zone covers a corridor 0.25D to either side of the line connecting the intersections and extending about 0.1D past both intersections. Note that this area covers the update zone 67 completely. Furthermore, the route followed by the vehicle cannot deviate by more than 0.25D from the straight-line path—this imposes a need for extra preset intersections on especially circuitous roads.

At a step 206, map and the vehicle position symbol are displayed on the display unit 20 so as to renew the display for the next intersection. Then, at a step 207, the program checks to see whether or not the next intersection is the one closest to the destination. The intersection closest to the destination will be referred to as the "target intersection". If the next intersection is the target intersection, a message "APPROACHING DESTINATION" is displayed on the display unit 20. In either case, at a step 209, the preset route is checked to see if the vehicle is to pass straight through the intersection rather than turning.

If the vehicle is to pass straight through the intersection, a flag FLG is reset at a step 210. Otherwise control passes to a step 301 (FIG. 4D) which will be discussed later. After the flag FLG is reset at the step 210, the program checks to see if the vehicle is in the update zone, at a step 211. If the vehicle is in the update zone, control passes to a step 212; otherwise the program goes to a step 218.

At the step 212, the distance $\int \Delta D$ travelled since the last intersection is compared with the known distance D between the two updating points. If the measured distance $\int \Delta D$ matches the known distance D, when checked at the step 212, control passes to a step 215 in which the vehicle position coordinates (x, y) are replaced by the coordinates $(x_1, y_1)$ of the current intersection. Thereafter, at a step 216, the travel distance $\int \Delta D$ between the intersections is reset to zero. Then, data identifying the current pair of intersections is updated so as to point to the next stretch of the preset route at a step 217. Thereafter, control returns to the step 203.

On the other hand, if the difference between the measured distance $\int \Delta D$ and the known distance D is other than zero at step 212, the flag FLG is set at a step 213. Then control returns to the step 211. The steps 211, 212 and 213 are repeated until the vehicle leaves the update zone or the difference between the calculated distance $\int \Delta D$ and the known distance D reaches zero when checked at the step 212, i.e. until the vehicle reaches the intersection.

If the vehicle is outside of the update zone at step 211, then the flag FLG is checked at a step 218. If the flag FLG is set, in a step 219, the coordinates $(x_n, y_n)$ of the intended intersection are used to replace the coordinates $(x_0, y_0)$. In other words, once the vehicle enters an update zone and the flag FLG is set to 1, that intersection will be assumed to be reached even if the known distance between intersections does not agree with the measured distance travelled by the vehicle. The travel distance value $\int \Delta D$ is reset to zero in step 220, and then control returns to the step 217.

If the flag FLG is not set when checked at the step 218, the program checks to see whether the vehicle is in the error zone, at a step 221. If NO, i.e., if the vehicle is outside of the error zone, the message "OFF COURSE" is displayed on the display screen, at a step 222 and the program ends. On the other hand, if the vehicle is still within the error zone, the program checks the CLEAR key in the setting device 17, at a step 223. If the CLEAR key has been depressed at the step 223, control returns to the initializing step 101. Otherwise, control passes to the step 210.

If the vehicle is to change direction significantly (step 209), control passes to a step 301, which checks to see if the vehicle is in the update zone. If so, the planned route through the current intersection is displayed graphically on the screen to aid the driver at this crucial point. The display image generated at the step 302 includes a number of indicator segments, each indicative of a given distance of vehicle travel arranged along the route in both entry and exit directions. At step 303, the distance travelled ∫ΔD is checked against the known distance D, and if there is less than 100 m difference, a turn indicator on the display starts to blink to signal that the vehicle should turn, in a step 305. Before the 100 m mark, the display segments are sequentially turned off with each unit of travel distance as the vehicle approaches the intersection, in a step 304. After step 305, the vehicle orientation is measured in step 306 and checked against the entry, exit and reset directions $\theta_{in}$, $\theta_{out}$, $\theta_r$ in steps 307, 308 and 309. If the vehicle direction is found to be erroneous in any of these steps, a step 312 checks to see if the vehicle is still in the update zone. If not, control passes to step 222, as the vehicle is clearly off course. Otherwise, the loop 307-308-309-312 is repeated until the vehicle turns far enough to match the reset direction $\theta_r$. Once this happens, control passes from step 309 to steps 310 and 311, which are identical to steps 215 and 216.

On the other hand, if the vehicle is not within the update zone when checked at the step 301, then the vehicle position is again checked to see if it is still within the error zone, at a step 313.

If the vehicle is outside of the error zone when checked at the step 313, the message "OFF COURSE" is displayed on the screen at the step 222. On the other hand, if the vehicle is within the error zone when checked at the step 313, then the program checks whether the CLEAR key has been depressed or not, at a step 314. If the CLEAR key has been depressed, then control returns to the initialization step 101; otherwise control returns to the step 301.

As described above, the intersection which is closest to the present vehicle position is used as the start intersection.

Once the vehicle approaches to within the predetermined distance, for example, 300 meters of the selected start intersection, the direction to the set start intersection with respect to the vehicle is displayed continuously. In addition, once the vehicle approaches to within the predetermined distance, the spatial relationship between the route along which the vehicle enters the start intersection and the route along which the vehicle exits same is displayed.

Therefore, even in cases where the vehicle misses the start intersection, the driver needs not newly enter the scheduled route of travel and can start the guidance process for the selected route from the nearest intersection.

As described above, the navigation system and method according to the present invention can guide the vehicle from the closest intersection and so can guide the vehicle to the destination without forcing the vehicle to return to the start intersection and without having to enter the route of travel again.

It will clearly be appreciated by those skilled in the art that the foregoing detailed description has been made in terms of the preferred embodiment and various changes and modifications may be made without departing from the scope of the present invention which is to be defined by the appended claims.

What is claimed is:
1. A system for navigating a vehicle, comprising:
 (a) first means for monitoring a distance travelled by the vehicle and vehicle direction and deriving the present position of the vehicle from the monitored distance and direction;
 (b) second means for storing roadmap data including data on a plurality of known branching points;
 (c) third means for designating a route of travel from a first known branching point through which the vehicle first passes en route to a final destination;
 (d) fourth means for searching through the known branching points present on the designated route of travel for the known branching point which is nearest to the present position of the vehicle derived by said first means; and
 (e) fifth means responsive to a start command for initiating navigation for guiding the vehicle along the designated route of travel from the known branching point found by said fourth means to the destination.

2. The system according to claim 1, wherein said third means includes:
 (a) sixth means for designating a start point and a destination of the vehicle on the roadmap;
 (b) seventh means for selecting said first known branching point and a final known branching point which approximately coincide with the designated start point and destination, respectively; and
 (c) eight means for searching the roadmap data for the shortest route of travel from the first known branching point to the final known branching point, thereby designating a route of travel for the vehicle to reach the final destination.

3. The system according to claim 1, wherein said fourth means comprises sixth means for sequentially comparing a first distance, between the present position of the vehicle and the first known branching point, with a second distance, between the present position of the vehicle and each of the known branching points stored in said second means and present on the designated route of travel, in order to determine which one of the known branching points is the nearest to the present position of vehicle.

4. The system according to claim 1, wherein said fifth means includes sixth means for displaying the roadmap on a screen, said sixth means displaying the direction of the vehicle monitored by said first means when approaching the known branching point found by said fourth means.

5. A system as recited in claim 1, wherein said second means is operable for including in said stored roadmap data a plurality of blocks including therein descriptions of said plurality of known branching points, each description including a first number of bits identifying a configuration of an intersection forming a branching point, a second number of bits identifying a location of the intersection, and a third number of bits identifying an orientation of the intersection.

6. A system as recited in claim 1 further comprising means for displaying said designated route of travel from said nearest branching point to said final destination,
 said means for displaying further comprising
 sixth means for determining whether the vehicle has approached to within a predetermined zone associated with a branching point on said designated route of travel; and
 seventh means responsive to said sixth means for providing, when the vehicle is within said zone, a more detailed display than when the vehicle is outside said zone, the more detailed display including a display of vehicle position and orientation and branching point entrance and exit orientations.

7. The system according to claim 5, which further comprises:
(a) sixth means for determining whether the vehicle has approached to within a predetermined distance of the first known branching point on the basis of the data on the present position of the vehicle derived by said first means; and
(b) seventh means for displaying the configuration of the first known branching point and a route of the vehicle as said vehicle approaches the first known branching point.

8. A method for navigating a vehicle, comprising the steps of:
(a) monitoring a distance travelled by the vehicle and vehicle direction and deriving the present position of the vehicle from the monitored distance;
(b) storing roadmap data in storing means, the roadmap data including a plurality of known branching points;
(c) designating a route of travel from a first known branching point through which the vehicle first passes en route to a final destination;
(d) searching through the known branching points present on the designated route of travel for the known branching point which is nearest to the present position of the vehicle derived in said step (a);
(e) determining whether a start command for initiating navigation for the vehicle along the designated route of travel is issued; and
(f) guiding the vehicle from the known branching point found in said step (d) to the destination when determining in said step (e) that the start command has issued.

9. The method according to claim 8, wherein said step (c) includes the steps of:
(a) designating a start point and a destination of the vehicle on the roadmap;
(b) selecting said first known branching point and a final known branching point which respectively approximately coincide with the designated start point and destination; and
(c) searching the roadmap data for the shortest route of travel from the first known branching point to the final known branching point, thereby designating a route of travel for the vehicle to reach the final destination.

10. The method according to claim 8, wherein said step (d) includes the steps of: calculating a first distance between the present position of the vehicle and the first known branching point designated in said step (c) and calculating a second distance between the present position of the vehicle and each of the known branching points stored in said step (b) and present on the designated route of travel; and sequentially comparing said first distance with the second distance for determining which one of the known branching points is the nearest to the present position of the vehicle.

11. A method as recited in claim 8, wherein said storing step (b) comprises the step of including in said stored roadmap data a plurality of blocks including therein descriptions of said plurality of known branching points, each description including a first number of bits identifying a configuration of an intersection forming a branching point, a second number of bits identifying a location of the intersection, and a third number of bits identifying an orientation of the intersection.

12. The method according to claim 11, which further comprises the steps of:
(g) determining whether the vehicle has approached to within a predetermined distance of the first known branching point on the basis of the data on the present position of the vehicle derived in said step (a); and
(h) displaying on display means the configuration of the first known branching point and a route of the vehicle as the vehicle approaches the first known branching point.

13. In a system for guiding operation of a vehicle from a first intersection of roadmap data to a destination intersection of the roadmap data, the improvement comprising:
first means for searching for a known intersection nearest to a current position of the vehicle than said first intersection and for guiding operation of the vehicle to said nearest intersection,
second means for indicating arrival of the vehicle within a predetermined zone associated with said nearest intersection, and
third means responsive to a start command for initiating guidance of the vehicle from said nearest intersection to said destination intersection.

14. An improved guiding system as recited in claim 13 further comprising fourth means responsive to said second means for displaying a preset travel course from said nearest intersection to said destination intersection.

* * * * *